United States Patent
Kudou et al.

(10) Patent No.: US 7,908,737 B2
(45) Date of Patent: Mar. 22, 2011

(54) PRODUCTION METHOD OF FLUID DYNAMIC-PRESSURE BEARING IN SPINDLE MOTOR

(75) Inventors: Hosei Kudou, Kyoto (JP); Hirofumi Takayama, Kyoto (JP); Takashi Nishina, Kyoto (JP); Masaaki Inagi, Kyoto (JP)

(73) Assignee: Nidec Corporation, Kyoto (JP)

( * ) Notice: Subject to any disclaimer, the term of this patent is extended or adjusted under 35 U.S.C. 154(b) by 554 days.

(21) Appl. No.: 12/107,953

(22) Filed: Apr. 23, 2008

(65) Prior Publication Data

US 2008/0265703 A1    Oct. 30, 2008

(30) Foreign Application Priority Data

Apr. 26, 2007    (JP) .................. 2007-116666

(51) Int. Cl.
*H02K 15/02*    (2006.01)
(52) U.S. Cl. ...................... 29/598; 29/898.02
(58) Field of Classification Search .............. 29/598, 29/407.01, 407.05, 898.02; 310/90
See application file for complete search history.

(56) References Cited

U.S. PATENT DOCUMENTS

| | | | |
|---|---|---|---|
| 6,299,356 B1 * | 10/2001 | Okamura et al. | 384/114 |
| 6,836,388 B2 | 12/2004 | Nishimura et al. | |
| 6,888,278 B2 | 5/2005 | Nishimura et al. | |

FOREIGN PATENT DOCUMENTS

| | | |
|---|---|---|
| JP | 10-160639 | 6/1998 |
| JP | 2000-205857 | 7/2000 |
| JP | 2003-166906 | 6/2003 |
| JP | 2004-205315 | 7/2004 |
| JP | 2004-340760 | 12/2004 |
| JP | 2005-328602 | 11/2005 |

* cited by examiner

*Primary Examiner* — Thiem Phan
(74) *Attorney, Agent, or Firm* — Keating & Bennett, LLP

(57) ABSTRACT

A gas is fed, so as to cause a gas flow to occur from a lower opening of a bearing hole of a sleeve 6 in an outward direction of an annular portion 12*a* of a rotor hub 12 via a radial gap 50 and an upper opening of the bearing hole, thereby lifting a rotor section 10. In a condition where the rotor section 10 is lifted, the magnitude of run-out synchronized with the rotation of the rotor section 10 is measured by using a displacement gauge 40. Then, based on the magnitude of run-out synchronized with the rotation, the run-out of the rotor section 10 is adjusted.

16 Claims, 7 Drawing Sheets

PRODUCTION METHOD OF FLUID DYNAMIC-PRESSURE BEARING IN SPINDLE MOTOR

BACKGROUND OF THE INVENTION

1. Field of the Invention

The present invention relates to a production method of a fluid dynamic-pressure bearing and a spindle motor furnished with the fluid dynamic-pressure bearing.

2. Description of the Related Art

Conventionally, various types of bearings are adopted in spindle motors used in hard disk drives. Such bearings include a fluid dynamic-pressure bearing, for example. The fluid dynamic-pressure bearing is provided with a shaft fixed to a rotor hub, a sleeve which is fixed to a base and into which the shaft is inserted, and a lubricating fluid retained between the shaft and the sleeve. In the fluid dynamic-pressure bearing, the rotor hub is supported in a condition where the rotor hub is not in contact with the sleeve (see, for example, Japanese Laid-Open Patent Publication No. 2003-088042).

In recent years, the density and the accuracy of hard disk drives are increased. In conjunction with the increase, the spindle motor used in the hard disk drive is required to rotate a rotor section having a rotor hub with high accuracy.

In order to rotate the rotor section with high accuracy, it is necessary that the accuracy of the rotor section be high. For the purpose of increasing the accuracy of the rotor section, it is necessary to perform various inspections not only after the completion of assembling the spindle motor but also in the middle of the assembling process thereof.

In the case where a spindle motor whose assembly is completed is determined not to satisfy the standards by the inspections, the spindle motor should be discarded. The discarding of spindle motor necessitates the cost. In addition, the discarding of motor deteriorates the productivity. Accordingly, it is preferred that some inspections should be performed before the completion of assembling the spindle motor and in a condition where only a small number of components for constituting the motor are mounted on the motor.

Moreover, in the inspections for the rotor section, in the case where an inspection gauge comes into contact with the rotor section, the press of the inspection gauge against the rotor section may disadvantageously cause the contact of the rotor section with the sleeve. As a result, at least one of the rotor section and the sleeve is damaged. Some of the bearings furnished with such a damaged rotor section or sleeve cannot exhibit desired performances as dynamic-pressure bearings.

SUMMARY OF THE INVENTION

According to the present invention, a production method of a fluid dynamic-pressure bearing used in a spindle motor including a stationary section including a sleeve having a bearing hole, and a rotor section including a shaft inserted into the bearing hole and an annular portion extending radially outwards from an outer circumferential face of the shaft, the rotor section rotating about a center axis, comprises: a lifting step for relatively lifting the rotor section with respect to the sleeve in a direction along the center axis by supplying a gas to a lower opening portion of the bearing hole, and by causing an airflow to occur in an outward direction of the annular portion via a radial gap between the outer circumferential face of the shaft and an inner circumferential face of the sleeve and an upper opening portion of the bearing hole; a measuring step for measuring run-out synchronized with the rotation of the rotor section with respect to the rotor section or the stationary portion while the lifted condition is maintained; and an adjusting step for adjusting the run-out synchronized with the rotation of the rotor section based on the measured result obtained in the measuring step.

According to the invention, the spindle motor is furnished with a fluid dynamic-pressure bearing produced by the production method of the fluid dynamic-pressure bearing according to the present invention.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
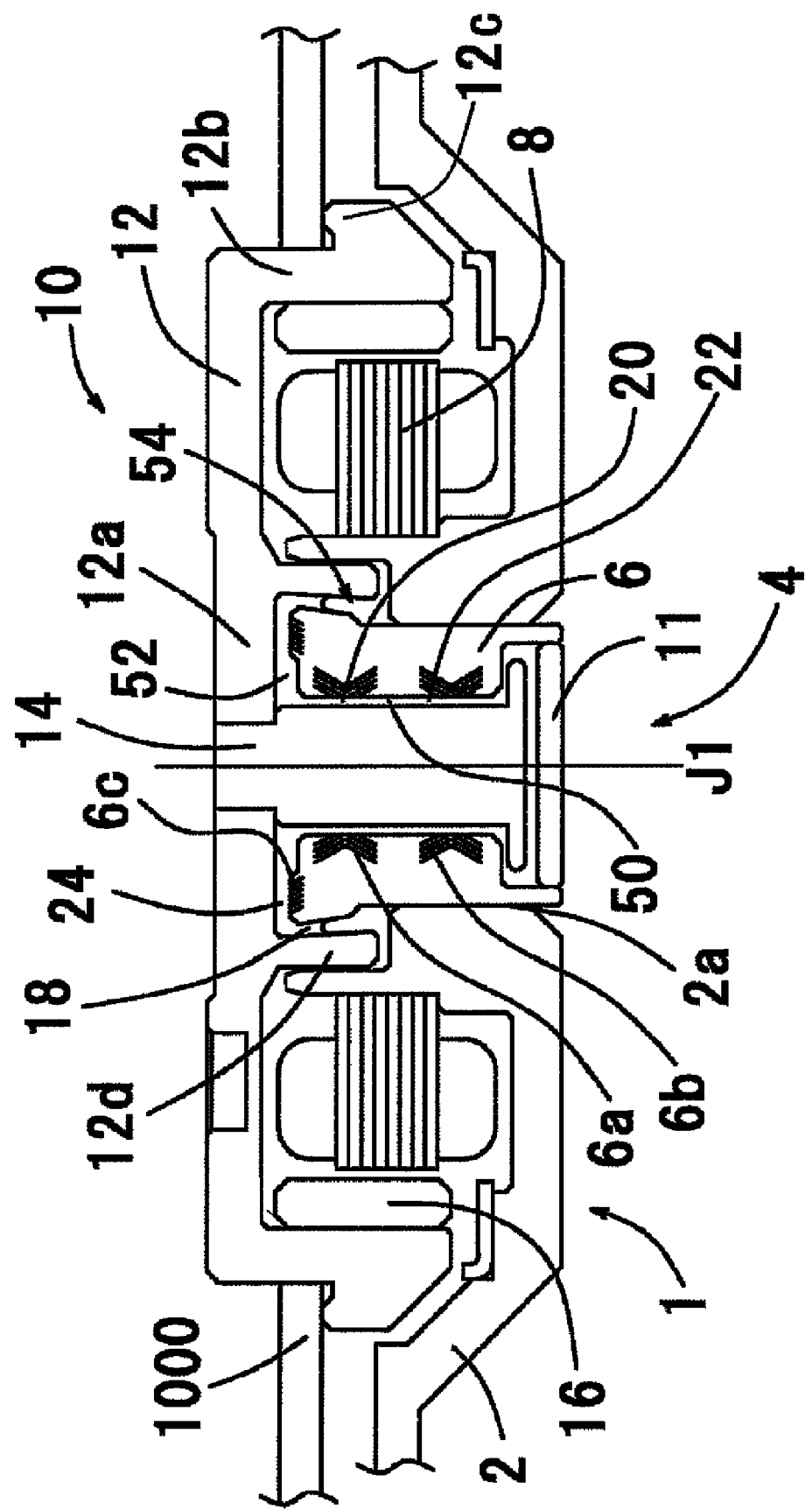
FIG. 1 is a cross-sectional view of a spindle motor according to a preferred embodiment of the present invention.

Referring to FIGS. 1 through 7, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

FIG. 1 is a cross-sectional view of a spindle motor according to a preferred embodiment of the present invention. Such a spindle motor is used in a hard disk drive, for example. The spindle motor includes a stationary section 1, a base plate 2 of a cup-like shape, a fluid dynamic-pressure bearing 4 disposed in a circular through hole 2a in a center portion of the base plate 2, and a rotor section 10 rotatably supported by the fluid dynamic-pressure bearing 4.

The fluid dynamic-pressure bearing 4 includes a hollow and cylindrical sleeve 6. The sleeve 6 has a bearing hole axially extending in the inside thereof. A lower end portion of the sleeve 6 is closed by a seal member 11. An inner circumferential face of the sleeve 6 is radially opposed to a shaft 14 via a radial gap 50.

The rotor section 10 includes a rotor hub 12, and a shaft 14 secured to the rotor hub 12. The shaft 14 rotates about a center axis J1 in a relative manner to the sleeve 6. The rotor hub 12 includes a substantially disk-like upper wall portion 12a, a cylindrical portion 12b hanging from an outer peripheral portion of the upper wall portion 12a, and a storage-medium carrying portion 12c, positioned in a lower end portion of the cylindrical portion 12b, on which a storage medium 1000 such as a disk is placed. The upper wall portion 12a in this embodiment corresponds to an annular portion in the present invention.

To an inner circumferential face of the cylindrical portion 12b, a rotor magnet 16 is attached by means of an adhesive, or the like. The rotor magnet 16 is radially opposed to a stator 8 via a gap.

In the above-described structure, a thrust gap 52 between a lower face of the upper wall portion 12a of the rotor hub 12 and an upper end face of the sleeve 6, a radial gap between an inner circumferential face of the sleeve 6 and an outer circumferential face of the shaft 14, and a gap between a lower end face of the shaft 14 and an upper face of the seal member 11 are all consecutive. Within these consecutive gaps, oil is continuously retained without interruption as a lubricating fluid.

A slope face is provided in an upper portion of the outer circumferential face of the sleeve 6. In the slope face, the outer diameter of the sleeve 6 shrinks with further separation from the upper end of the sleeve 6 axially downwards. Between the slope face and an annular wall portion 12d of the upper wall portion 12a of the rotor hub 12 opposed to the slope face, a seal gap 54 is formed. The radial gap size of the seal gap 54 is increased axially downwards. That is, the upper portion of the outer circumferential face of the sleeve 6 and the annular wall portion 12d constitute a taper seal portion 18. In the taper seal portion 18, the surface tension of the oil and atmospheric pressure balance. In addition, in the taper seal portion 18, the oil-air interface is formed into a meniscus.

Next, the fluid dynamic-pressure bearing 4 will be described.

In the radial gap 50 between the inner circumferential surface of the sleeve 6 and the outer circumferential surface of the shaft 14, an upper radial dynamic-pressure bearing 20 and a lower radial dynamic-pressure bearing 22 are disposed in such positions that they are mutually spaced axially. The upper radial dynamic-pressure bearing 20 and the lower radial dynamic-pressure bearing 22 include the inner circumferential face of the sleeve 6, the outer circumferential face of the shaft 14, and the oil retained in the radial gap 50 between the sleeve 6 and the shaft 14, respectively.

In a portion of the inner circumferential face of the sleeve 6 which constitutes the upper radial dynamic-pressure bearing 20, herringbone dynamic-pressure grooves 6a are formed for inducing the oil from axially both end portions of the upper radial dynamic-pressure bearing 20 to a substantially center portion of the upper radial dynamic-pressure bearing 20. In a portion of the inner circumferential face of the sleeve 6 which constitutes the lower radial dynamic-pressure bearing 20, herringbone dynamic-pressure grooves 6b are formed similarly. When the rotor section 10 spins, due to the pressure generated by the upper radial dynamic-pressure bearing 20 and the lower radial dynamic-pressure bearing 22, the shaft 14 is supported in a non-contact condition.

In the thrust gap 52 between the upper end face of the sleeve 6 and the lower face of the upper wall portion 12a of the rotor hub 12, a thrust dynamic-pressure bearing 24 is disposed. The thrust dynamic-pressure bearing 24 includes the upper end face of the sleeve 6, the lower face of the upper wall portion 12a of the rotor hub 12, and the oil retained in the thrust gap 52.

On the upper end face of the sleeve 6, thrust dynamic-pressure generating grooves 6c of spiral shape is formed for inducing the oil radially inwardly when the rotor section 10 spins. When the rotor section 10 spins, the thrust dynamic-pressure bearing 24 induces pressure radially inwardly by using the thrust dynamic-pressure generating grooves 6c.

Due to the pressure, the oil internal pressure is increased. As a result, fluid dynamic pressure exerting in a direction in which the rotor section 10 is lifted is generated. The pressure of the oil retained in the radial gap 50 and the pressure of the oil retained in the gap between the lower end face of the shaft 14 and the upper face of the seal member 11 are maintained to be positive. It is understood that herringbone grooves may be provided alternatively as the thrust dynamic-pressure generating grooves 6c.

Figure 2:
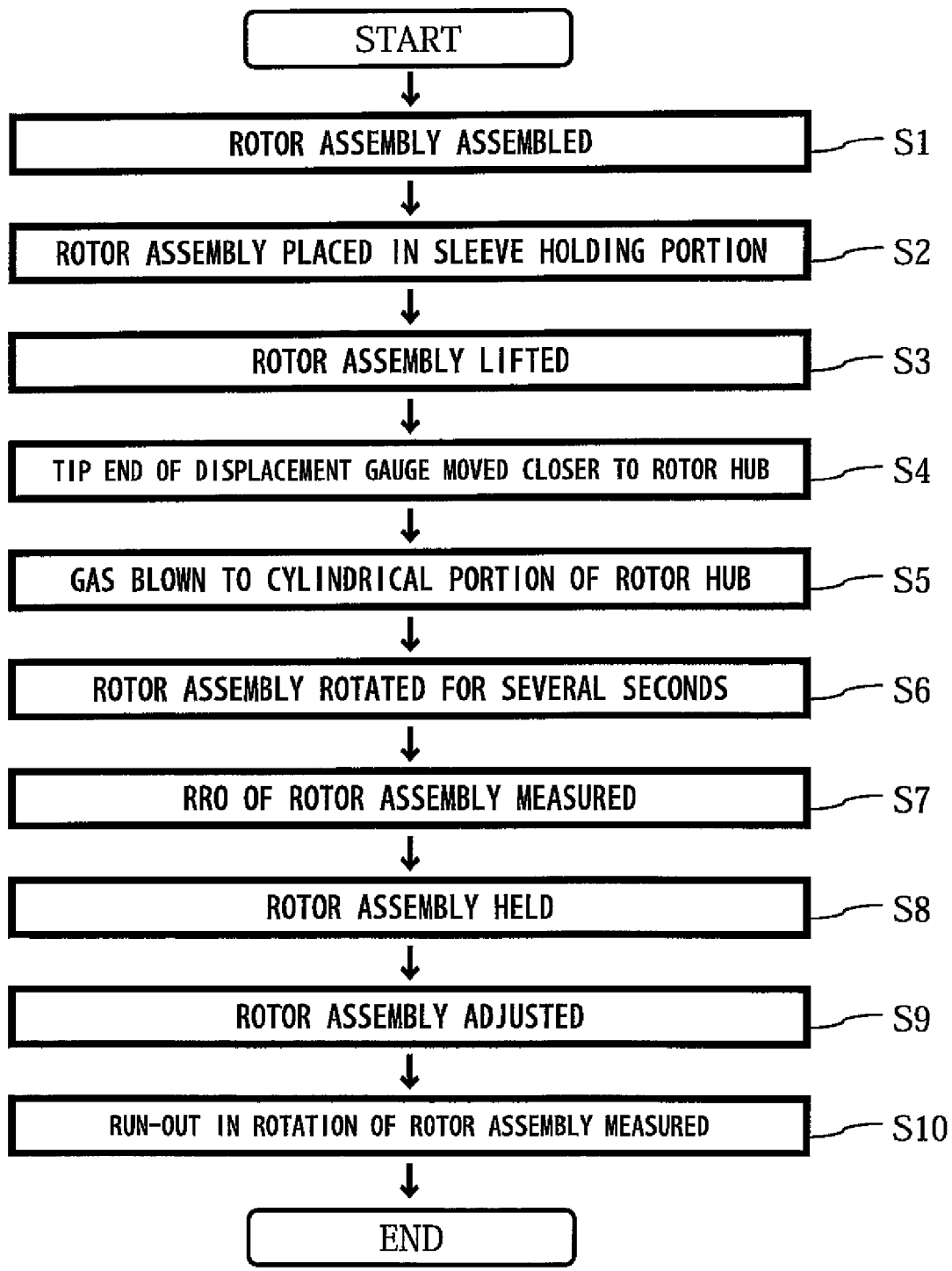
FIG. 2 is a flowchart illustrating a production method of a rotor assembly.
Figure 3:
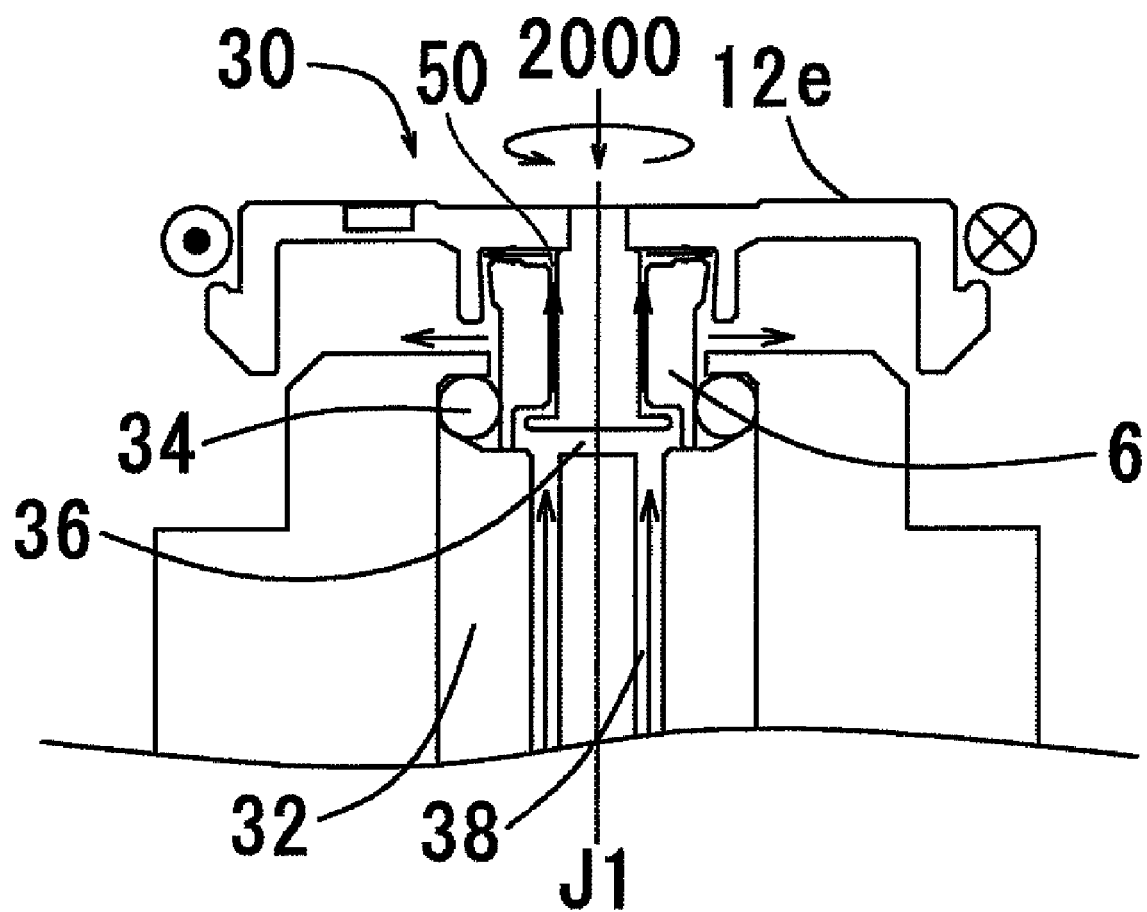
FIG. 3 shows a lifted condition of the rotor assembly.
Figure 4:
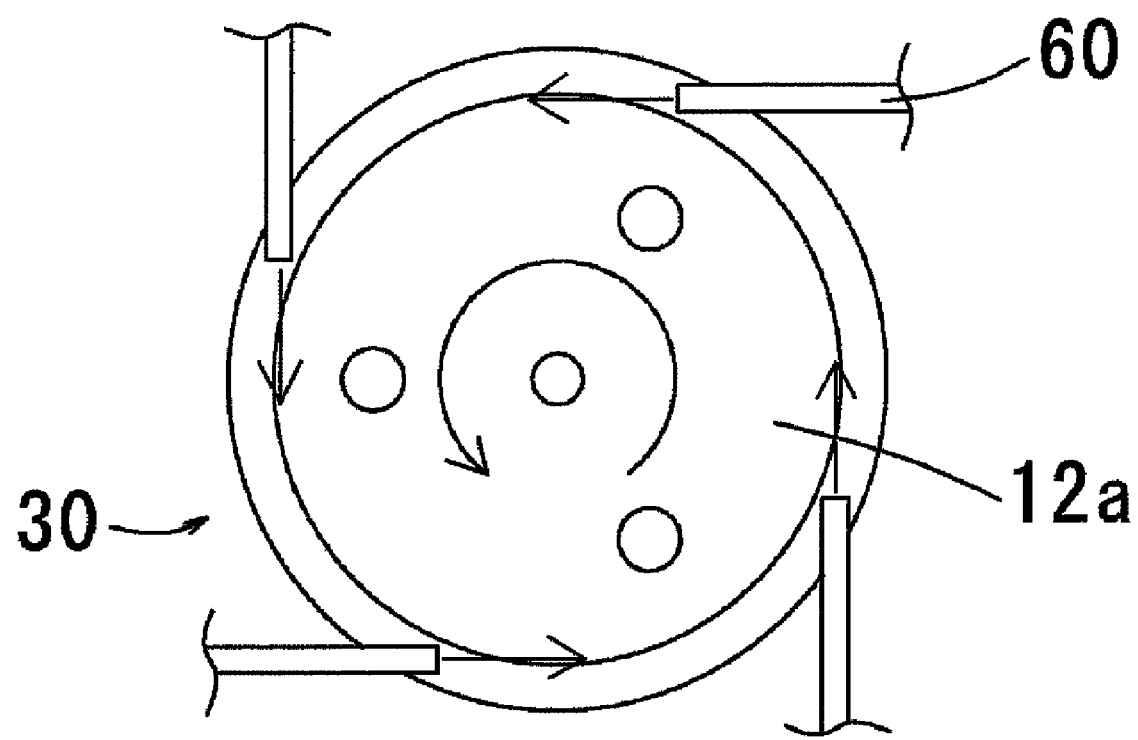
FIG. 4 is a diagram of a rotor hub in FIG. 3 viewed from an axially upper side.
Figure 5:
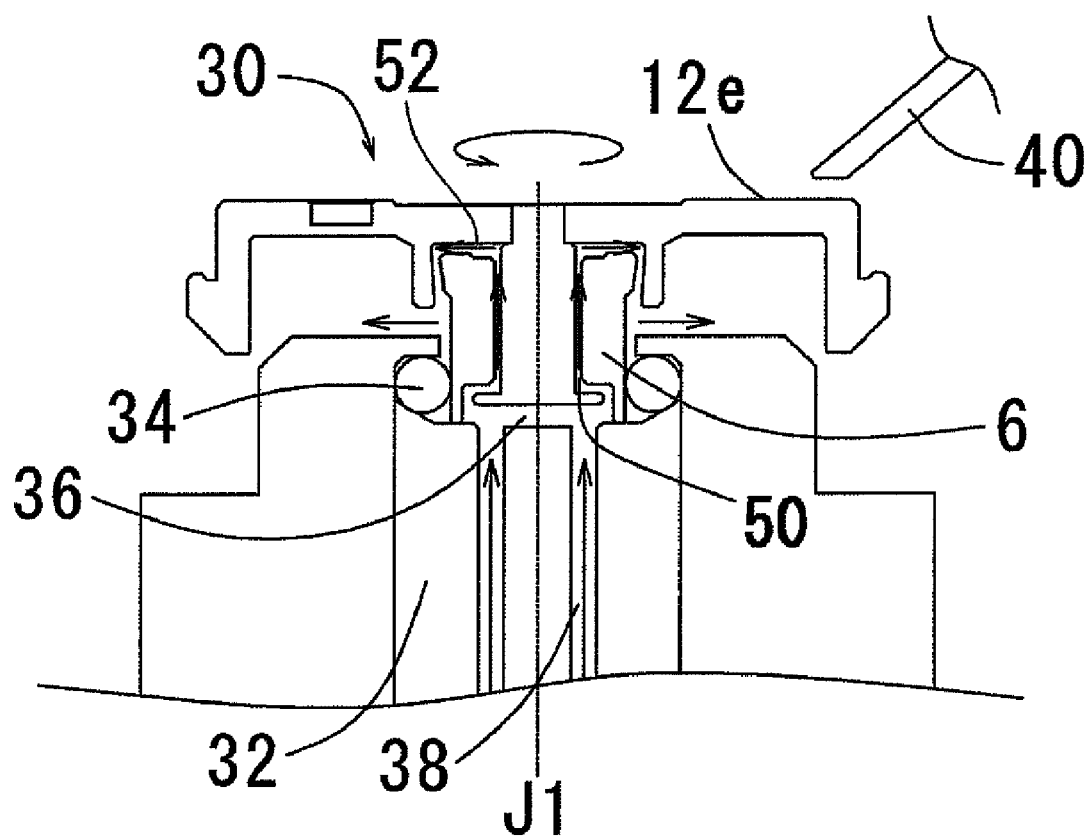
FIG. 5 shows relative positions of the rotor assembly and a displacement gauge in the lifted condition of the rotor assembly.
Figure 6:
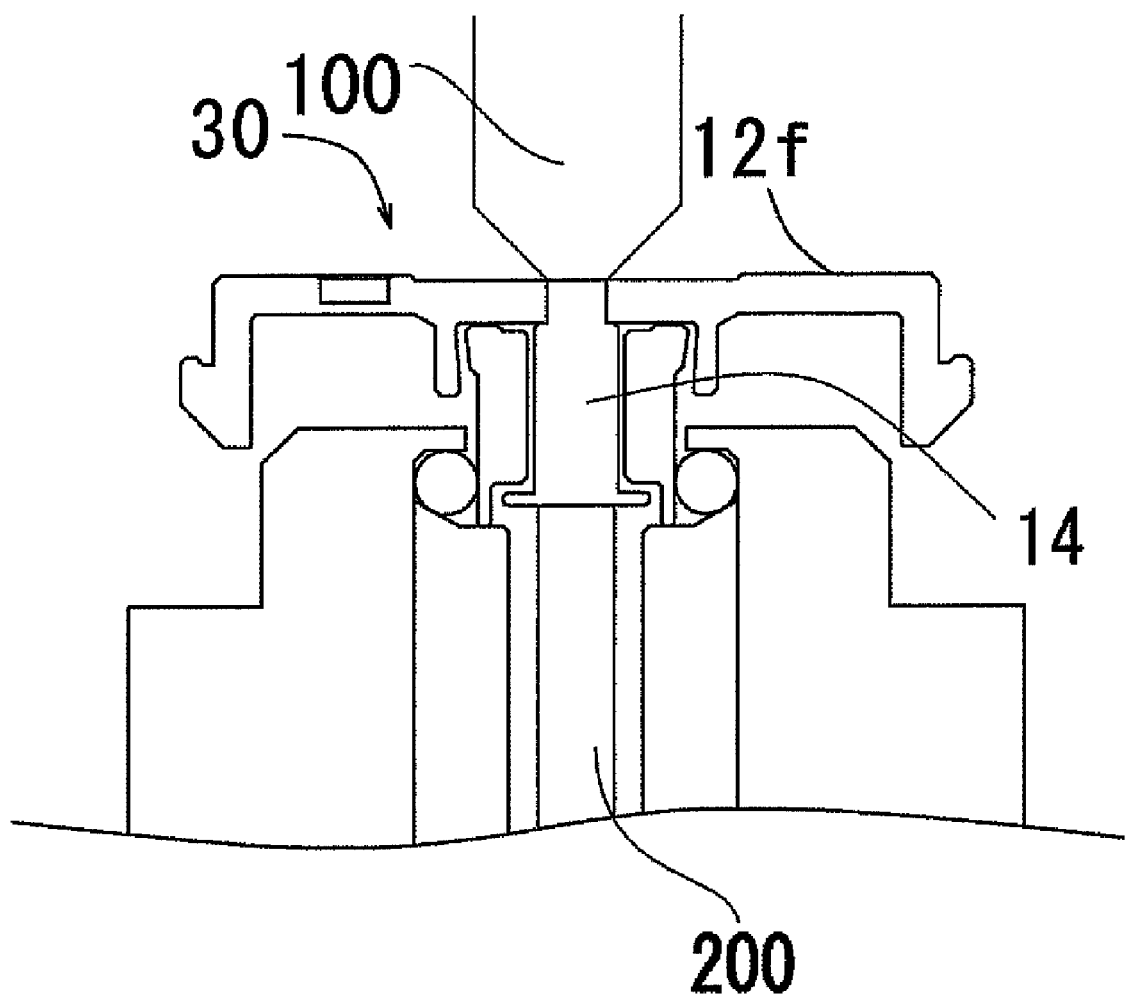
FIG. 6 shows an exemplary fixing method of the rotor assembly.
Figure 7:
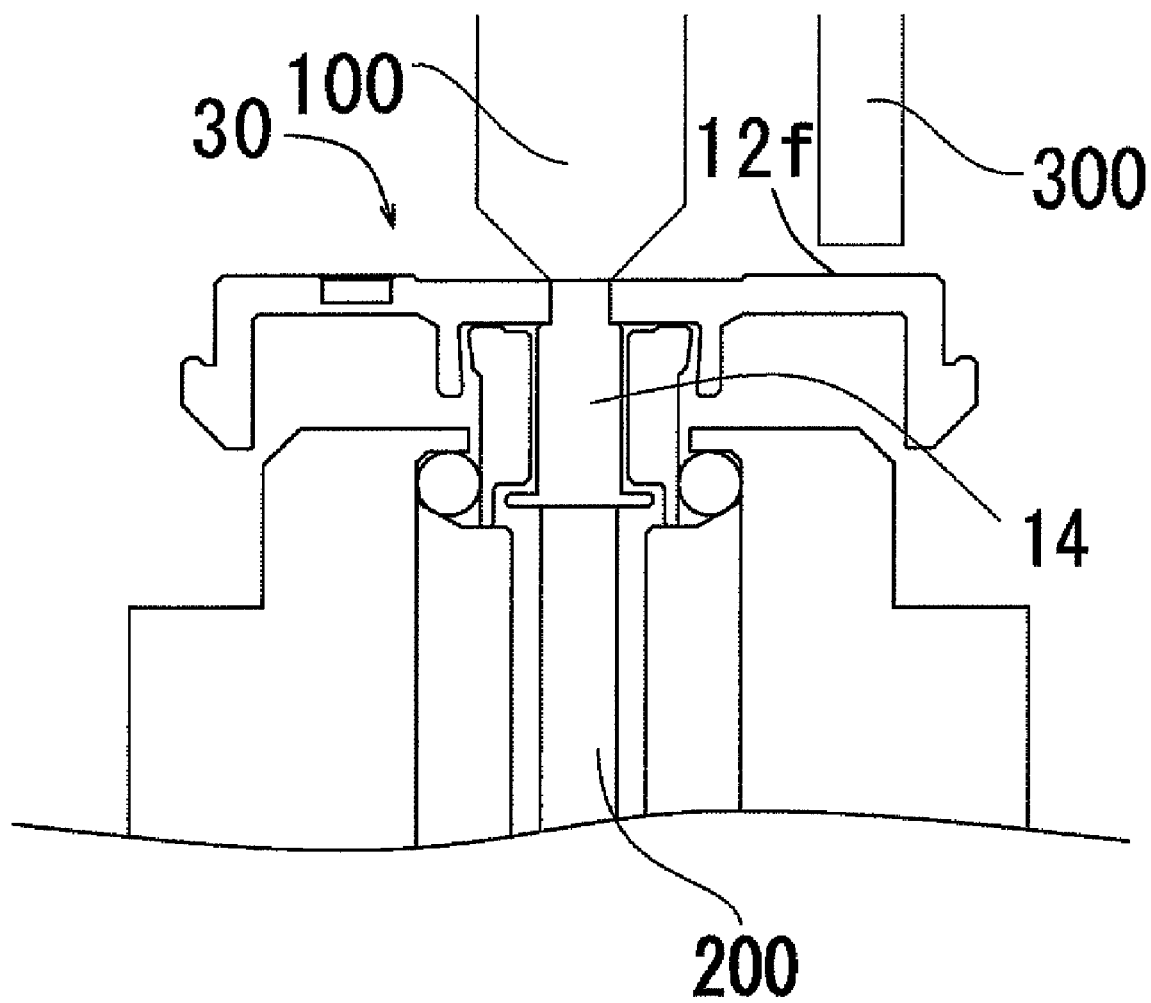
FIG. 7 shows an exemplary adjusting method of the rotor assembly.

Hereinafter part of the production method of a spindle motor according to the present invention will be described. FIG. 2 shows a flow in part of the production method according to a preferred embodiment of the present invention in which run-out in rotation of the rotor section 10 is measured and adjusted. FIG. 3 shows a lifted condition of the rotor section 10. FIG. 4 is a diagram of the rotor hub 12 viewed from a direction indicated by arrow 2000 in FIG. 3. FIG. 5 shows relative positions of the rotor assembly 30 and a displacement gauge 40 in a condition where the rotor assembly 30 is lifted. FIG. 6 shows relative positions of the rotor assembly 30, an upper fixing jig 100, and a lower fixing jig 200 in a condition where the rotor assembly 30 is fixed. FIG. 7 shows relative positions of the rotor assembly 30 and a run-out adjusting jig 300 when the rotor assembly 30 is to be adjusted.

Prior to the description of the process step for measuring run-out in rotation of the rotor section 10, a process step for assembling the rotor assembly 30 shown in FIG. 3 will be described. First, the shaft 14 is inserted into the sleeve 6 through a lower opening of the sleeve 6. Next, to the upper portion of the outer circumferential face of the shaft 14, the rotor hub 12 is fixed by means of press fitting and/or an adhesive or the like. In this way, the rotor assembly 30 including the rotor hub 12, the shaft 14, and the sleeve 6 is configured (step S1).

Next, the process step for measuring run-out in rotation will be described. First, the rotor assembly 30 is placed in a sleeve holding portion 32 (step S2). In the inside of the sleeve holding portion 32, a ring-like member 34 is disposed. When the rotor assembly 30 is placed in the sleeve holding portion 32, the ring-like member 34 is elastically deformed, thereby gripping the sleeve 6 due to the radially inward elastic force. With this configuration, the sleeve 6 is held in the sleeve holding portion 32.

In step S2, the shaft 14 is not in contact with the sleeve holding portion 32. Specifically, as shown in FIG. 3, a gap 36 is formed between the lower end portion of the shaft 14 and the sleeve holding portion 32. With this configuration, it is possible to prevent the rotor assembly 30 from being lifted in a condition where the Shaft 4 leans and abuts against the sleeve holding portion 32. Accordingly, the rotor assembly 30 can stably be lifted.

Then, a gas having a predetermined pressure is fed to the radial gap 50 and the thrust gap 52 through a gas passage hole 38 from a pump (not shown). By means of the fed gas, the rotor assembly 30 is lifted (step S3). Specifically, as indicated by arrows in FIG. 3, the gas fed through the gas passage hole 38 flows from a lower opening of the radial gap 50 to an upper opening thereof, and then from a radially inner end portion of the thrust gap 52 to a radially outer end portion thereof. Such a gas flow makes the air pressure of the lower opening of the radial gap 50 higher than the air pressure in the region on the upper side of the upper wall portion 12a of the rotor hub 12. The gas flowing to the radially outer end portion of the thrust gap 52 is exhausted to the exterior of the bearing through the seal gap 54. In this embodiment, the rotor hub 12 is lifted by about 10 μm.

In this embodiment, the air is used as the gas. It is understood that any kind of gas can be used as the gas even if the gas does not affect the quality of the spindle motor after the completion of assembling. For example, nitrogen gas, helium gas, or the like can be applied.

In the condition where the rotor hub 12 is lifted, a tip end of the displacement gauge 40 for measuring the run-out in rotation of the rotor section 10 is moved closer to an outer peripheral portion of the rotor hub 12 (step S4). In the condition where the rotor hub 12 is lifted, the displacement gauge 40 is not in contact with the rotor assembly 30.

As shown in FIG. 4, simultaneously with or after the feeding of the gas to the radial gap 50, a gas is blown from nozzles 60 to the cylindrical portion 12b of the rotor hub 12 (step S5). The gas may be the same gas as that fed to the radial gap 50, or may be a different kind of gas. The gas is blown from four points in the circumferential direction to the cylindrical portion 12b. The direction in which the gas is blown to the cylindrical portion 12b is the same direction as the rotating direction of the motor. With this configuration, the rotor assembly 30 makes 100 to 400 rotations per minute.

During the rotation of the rotor assembly 30, the gas is always fed to the radial gap 50 and the thrust gap 52. Accordingly, a static-pressure gas bearing is constituted in the radial gap 50 and the thrust gap 52. The rotor assembly 30 is supported in a non-contact manner.

When the rotor assembly 30 is lifted, the size of the radial gap 50 is preferably about 10 μm or less. The size of the thrust gap 52 is preferably about 50 μm or less which is larger than the size of the radial gap 50. With this configuration, the gas to be fed is caused to easily flow from the radial gap 50 to the thrust gap 52, and the upper wall portion 12a of the rotor hub 12 is pressed upwardly. As a result, the contact of the rotor hub 12 with the sleeve 6 at the start of and immediately after the rotation of the rotor assembly 30 can be reduced.

The ring-like member 34 is closely in contact with the sleeve 6 in the elastically deformed condition. Accordingly, it is possible to suppress the leakage of gas through a gap between the sleeve 6 and the sleeve holding portion 32.

Next, in the condition where the gas is fed from the gas passage hole 38, the blowing of the gas from the nozzles 60 to the cylindrical portion 12b of the rotor hub 12 is stopped. Thereafter, the rotor assembly 30 rotates for a period of several seconds (step S6). In step S6, in the condition where the blowing of the gas from the nozzles 60 to the cylindrical portion 12b is stopped, the rotor assembly 30 makes coasting rotations.

Thereafter, until the rotation of the rotor assembly 30 stops, the magnitude of run-out in rotation synchronized with the rotation of the rotor assembly 30 is measured by the displacement gauge 40 by using a region 12e of the upper end surface of the rotor hub 12 shown in FIG. 5 as a reference. That is, RRO (Repeatable Run Out) of the rotor assembly 30 in the axial direction is measured (step S7). The measurement is performed several times during the rotation of the rotor assembly 30.

In step S7, since the displacement gauge 40 is not in contact with the rotor assembly 30 during the measurement of the run-out in rotation of the rotor assembly 30, any pressure is not applied externally to the rotor assembly 30. Accordingly, the run-out in rotation of the rotor assembly 30 can be measured with high accuracy.

In step S7, the rotor assembly 30 is supported in the non-contact condition with the sleeve 6 during the measurement of the run-out in rotation of the rotor assembly 30. At this time, the rotor assembly 30 rotates similarly to the completed motor. Accordingly, the value of the run-out in rotation measured in step S7 has high correlation to the value of run-out in rotation measured after the completion of assembling the spindle motor. This results in efficient production of motors. In other words, the productivity of motors is improved.

As for the rotor assembly 30, the run-out in rotation thereof is measured in the condition where the rotor assembly 30 is not in contact with the displacement gauge 40. Accordingly, even when the run-out values in rotation are measured several times, the repeat accuracy of the run-out values in rotation can be improved.

The improvements in repeat accuracy and the measurement accuracy also improve the run-out values in rotation. Accordingly, in the case where any standard is provided for the run-out values in rotation in the production of motors, it is properly determined whether the run-out values in rotation satisfy the standards. This results in improvements of quality and productivity of motors.

If the run-out in rotation of the rotor assembly 30 is measured in a condition where the displacement gauge 40 is in contact with the rotor assembly 30, the rotor hub 12 may come into contact with the sleeve 6, so that at least one of the rotor hub 12 and the sleeve 6 may be damaged. However, in the present invention, the displacement gauge 40 is not in contact with the rotor assembly 30, so that it is possible to prevent the rotor hub 12 and the sleeve 6 from being damaged.

In addition, since the displacement gauge 40 of non-contact type is used, the measurement resolution is increased, and the measurement accuracy is improved.

In the present invention, the gas is fed from the lower end opening portion of the radial gap 50 to the upper end opening portion thereof, thereby lifting the rotor assembly 30. Accordingly, with the above-described simplified configuration, the rotor assembly 30 can be efficiently lifted irrespective of the material for the sleeve.

Next, a method for holding the rotor assembly 30 after the measuring process of the run-out in rotation will be described. Based on the run-out values measured by the above-described measuring process, the rotor assembly 30 is adjusted. Prior to the adjusting step, the rotor assembly 30 which is lifted is held (step S8). FIG. 6 shows the relative positions of the rotor assembly 30, and an upper holding jig 100 and a lower holding jig 200. For the rotor assembly 30 which is axially lifted as shown in FIG. 5, the upper holding jig 100 is lowered from the axially upper side, thereby pressing the axially upper end face of the shaft 14 from the axially upper side. At this time, the axially lower end face of the shaft 14 is in contact with an upper end face of the lower holding jig 200.

Next, an adjusting method of the rotor assembly 30 will be described. After the rotor assembly 30 is held by the above-described holding method, in the upper end face of the rotor assembly 30, in the upper end face of the rotor assembly 30, the adjustment is performed for a point 12f in which the run-out value in rotation obtained by the above-described measuring method is out of the predetermined standard values (step S9). FIG. 7 shows the relative positions of the rotor assembly 30 and a run-out adjusting jig 300 in a preferred embodiment of the adjusting method of the present invention.

As shown in FIG. 7, the rotor assembly 30 is held in such a manner that the axially upper and lower end faces of the shaft 14 are pressed by the upper holding jig 100 and the lower holding jig 200, respectively. In this example, the point 12f in the upper surface of the rotor hub 12 in which the run-out value in rotation is positively large is hammered by a run-out adjusting jig 300 from the axially upper side. By hammering the point 12f in which the run-out value is positively large from the axially upper side, the run-out value in rotation of the rotor assembly 30 is reduced. Accordingly, the rotor assembly 30 is adjusted.

For the run-out adjusting jig 300, the displacement gauge 40 used in the above-mentioned measuring process may be used.

After the adjusting process, the run-out in rotation is measured again by the above-described measuring method (step S10). If the run-out value in rotation obtained by the second measurement is not within the predetermined standard values, the above-described holding process and the above-described adjusting process are performed, thereby adjusting the rotor assembly 30 again.

Thereafter, until the run-out in rotation falls in the predetermined standard values, the adjusting process and the measuring process are repeated.

As described above, by the production method of a fluid dynamic-pressure bearing according to the present invention, it is possible to inspect the fluid bearing with high accuracy in the middle of assembling the spindle motor. In addition, in the production method of the fluid dynamic-pressure bearing according to the present invention, it is possible to measure the magnitude of run-out synchronized with the rotation of the rotor section with high accuracy.

In the production method of the fluid dynamic-pressure bearing according to the present invention, the inspection is performed in the condition where the rotor section is not in contact with the stationary section in the fluid dynamic-pressure bearing. Accordingly, in the production method of the fluid dynamic-pressure bearing according to the present invention, it is possible to prevent the rotor section or the sleeve from being damaged.

By the production method of the fluid dynamic-pressure bearing according to the present invention, it is possible to provide a fluid dynamic-pressure bearing which is superior in reliability and durability and a spindle motor furnished with the fluid dynamic-pressure bearing.

While preferred embodiments of the present invention have been described above, it is to be understood that variations and modifications will be apparent to those skilled in the art without departing the scope and spirit of the present invention. The scope of the present invention, therefore, is to be determined solely by the following claims.

For example, as items to be measured in the measuring process, the lifted amount or the rotation torque of the rotor section, the thrust gap, or the like can be measured. Alternatively, it is possible to perform the detection of modulation.

The annular portion is not limited to the upper wall portion 12a of the rotor hub 12. Alternatively, the annular portion may be configured by fixing a member which is different from the rotor hub to the shaft.

What is claimed is:

1. A production method of a fluid dynamic-pressure bearing used in a spindle motor comprising a stationary section including a sleeve having a bearing hole, and a rotor section including a shaft inserted into the bearing hole and an annular portion extending radially outwards from an outer circumferential face of the shaft, the rotor section rotating about a center axis, comprising:
    a lifting step for relatively lifting the rotor section with respect to the sleeve in a direction along the center axis by supplying a gas to a lower opening portion of the bearing hole, and by causing an gas flow to occur in an outward direction of the annular portion via a radial gap between the outer circumferential face of the shaft and an inner circumferential face of the sleeve and an upper opening portion of the bearing hole;
    a measuring step for measuring run-out synchronized with the rotation of the rotor section with respect to the rotor section or the stationary portion while the lifted condition is maintained; and
    an adjusting step for adjusting the run-out synchronized with the rotation of the rotor section based on the measured result obtained in the measuring step.

2. The production method of a fluid dynamic-pressure bearing according to claim 1, wherein the rotor section further includes a cylindrical portion extending downwardly from an outer peripheral portion of the annular portion and a storage-medium carrying portion positioned in a lower end of the cylindrical portion on which a storage medium is placed.

3. The production method of a fluid dynamic-pressure bearing according to claim 2, wherein the measurement in the measuring step is performed to a fluid dynamic-pressure bearing in a condition where the rotor section rotates with respect to the stationary section by blowing a circumferential gas flow to the cylindrical portion prior to the measuring step while the lifted condition is maintained.

4. The production method of a fluid dynamic-pressure bearing according to claim 2, wherein the measurement in the measuring step is performed to a fluid dynamic-pressure bearing in a condition where the rotor section rotates with respect to the stationary section by blowing a circumferential gas flow to an outer peripheral portion of the cylindrical portion prior to the measuring step while the lifted condition is maintained.

5. The production method of a fluid dynamic-pressure bearing according to claim 1, wherein the blowing of the gas flow is stopped prior to the measuring step, and thereafter the measurement is performed before the rotation of the rotor section stops.

6. The production method of a fluid dynamic-pressure bearing according to claim 1, wherein the rotor section further includes an annular wall portion extending downwardly from a lower surface of the annular portion and radially facing an outer circumferential face of the sleeve, and
    in the lifting step, the gas supplied from the upper opening of the bearing hole passes through a thrust gap between the lower face of the annular portion and an upper end face of the sleeve, and a seal gap between the outer circumferential face of the sleeve and the annular wall portion, and then the gas is exhausted.

7. The production method of a fluid dynamic-pressure bearing according to claim 6, wherein a gap size of the thrust gap is 50 μm or less which is larger than a gap size of the radial gap, and
    in the thrust gap, a thrust dynamic-pressure bearing portion having thrust dynamic-pressure generating grooves for inducing dynamic pressure in a lubricating fluid retained in the thrust gap when the rotor section spins is configured.

8. The production method of a fluid dynamic-pressure bearing according to claim 1, wherein a gap size of the radial gap is 10 μm or less, and
    in the radial gap, a radial dynamic-pressure bearing portion having radial dynamic-pressure generating grooves for inducing dynamic pressure in a lubricating fluid retained in the radial gap when the rotor section spins is configured.

9. The production method of a fluid dynamic-pressure bearing according to claim 1, wherein a production apparatus used in the measuring step includes a sleeve holding portion having a gas feeding portion extending in the direction along the center axis for holding a lower portion of the sleeve, and between a lower portion of the outer circumferential face of the sleeve and the sleeve holding portion, an elastic ring-like member is fitted in.

10. The production method of a fluid dynamic-pressure bearing according to claim 1, wherein the lifting step and the measuring step are performed after the adjusting step.

11. The production method of a fluid dynamic-pressure bearing according to claim 10, wherein after the measuring step for the second time, the adjusting step, the lifting step, and the measuring step are sequentially performed repeatedly one or more times.

12. The production method of a fluid dynamic-pressure bearing according to claim 1, further comprising a holding step for holding the rotor section after the measuring step is performed and before the adjusting step is performed.

13. The production method of a fluid dynamic-pressure bearing according to claim 12, wherein in the holding step, an axially upper end face of the shaft is pressed.

14. The production method of a fluid dynamic-pressure bearing according to claim 1, wherein in the measuring step, run-out in rotation is measured by using a displacement gauge.

15. The production method of a fluid dynamic-pressure bearing according to claim 1, wherein in the adjusting step, a part of an upper surface of the rotor section is hammered.

16. The production method of a fluid dynamic-pressure bearing according to claim 15, wherein in the adjusting step, the part of the upper surface is hammered by means of a displacement gauge used for the measurement in the measuring step.

* * * * *